United States Patent
Effimov

(10) Patent No.: US 7,864,388 B2
(45) Date of Patent: Jan. 4, 2011

(54) METHOD AND APPARATUS FOR RECODING HOLOGRAPHIC DIFFRACTION GRATINGS

(75) Inventor: Oleg Effimov, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 611 days.

(21) Appl. No.: 11/281,034

(22) Filed: Nov. 17, 2005

(65) Prior Publication Data

US 2007/0109949 A1    May 17, 2007

(51) Int. Cl.
G03H 1/26    (2006.01)
(52) U.S. Cl. .......................... 359/22; 359/35
(58) Field of Classification Search .............. 359/31, 359/12, 1, 17, 22, 25, 35; 385/37; 430/1, 430/2
See application file for complete search history.

(56) References Cited

U.S. PATENT DOCUMENTS

| | | | | |
|---|---|---|---|---|
| 3,530,442 | A * | 9/1970 | Collier et al. | 365/125 |
| 3,650,605 | A * | 3/1972 | Little, Jr. | 359/15 |
| 3,834,786 | A | 9/1974 | Carlsen | |
| 5,479,273 | A * | 12/1995 | Ramsbottom | 359/9 |
| 6,473,443 | B1 | 10/2002 | Kuo et al. | |
| 6,747,798 | B2 * | 6/2004 | Kristensen et al. | 359/566 |
| 7,085,450 | B2 * | 8/2006 | Biyikli et al. | 385/37 |
| 7,092,134 | B1 * | 8/2006 | Han et al. | 359/35 |
| 7,184,616 | B2 * | 2/2007 | Mead et al. | 385/10 |
| 2003/0156791 | A1 | 8/2003 | De Groot | |
| 2005/0111791 | A1 | 5/2005 | Efimov et al. | |

FOREIGN PATENT DOCUMENTS

WO    WO 01/13181 A    2/2001

OTHER PUBLICATIONS

Andreas Othonos, Kyriacos Kalli, Fiber Bragg Gratings, 1999, pp. 149-162, Norwood, Massachusetts.
Oleg M. Efimov, Leonid B. Glebov, Larissa N. Glebova, Kathleen C. Richardson, Vadim I. Smirnov, High-Efficiency Bragg Gratings in Photothermorefractive Glass, Feb. 1999, pp. 619-627, Orlando, Florida.
Herwig Kogelnik, Coupled Wave Theory for Thick Hologram Gratings, Nov. 1969, pp. 2909-2944, vol. 48, No. 9.
PCT Search Report and Written Opinion of the ISA for PCT/US2006/041916 dated Apr. 12, 2007.
Lee, C-K et al,; "Optical configuration and color-representation range of a variable-pitch dot matrix holographic printer"; Applied Optics, OSA, Optical Society of America, Washing, DC. vol. 39, No. 1, Jan. 1, 2001, pp. 40-53.

* cited by examiner

*Primary Examiner*—Alessandro Amari
(74) *Attorney, Agent, or Firm*—Daly, Crowley, Mofford & Durkee, LLP

(57) ABSTRACT

A method and apparatus for scanning an input beam of light in a two dimensional pattern; splitting the scanned input beam of light into two output beams of light, each one of the two output beams of light passing along a different path to a common region in a recording medium, such region scanning the recording medium during the scanning of the input beam of light to produce a diffraction grating in the recording medium by interference between the two output beams of light.

18 Claims, 7 Drawing Sheets

METHOD AND APPARATUS FOR RECODING HOLOGRAPHIC DIFFRACTION GRATINGS

TECHNICAL FIELD

This invention relates generally to methods and apparatus for recording holographic diffraction gratings and more particularly to methods and apparatus for storing large sized, highly homogeneous holographic diffraction gratings.

BACKGROUND

As is known in the art, systems and methods for creating large size, highly homogeneous surface and volume diffraction gratings are sought in many applications. In most cases, such gratings are created by interfering two large-size well-characterized optical beams having plane wavefronts on a recording media. If large-sized high-homogeneous holograms are required, large interfering beams have to be applied. To provide approximately the same exposure dosage over a recording media, just the central part of Gaussian beams is usually used for recording. It necessitates getting even larger interfering beams. Such beams are created by expanding the output of well-characterized, single-transverse-mode lasers from 1-2 mm diameter to several centimeters or even to several tens of centimeters. However, there are a few drawbacks of the application of high expanded beams: (1) Large-sized and rather expensive optics is needed for a large beam expansion; (2) There is still a considerable difference in the exposure dosage of different parts of holograms even in the case of very high magnification of Gaussian beams; (3) A large expansion is hard to implement without truncating the edges of the expanded beams on the various unavoidable apertures in any practical holographic set up. The beam truncation causes diffraction, which manifests itself as additional patterns in the hologram. These parasitic patterns modulate the dominant grating of the hologram and reduce the overall performance of the final product; and, (4) Truncating the edges of the expanded beams decreases the total usable power of the interfering beams, which necessitates undesirable lengthy exposures.

More particularly, interference patterns to record surface and volume holograms are usually created with wavefront-splitting interferometers, phase-masks, or amplitude-splitting interferometers, see, for example, Fibre Bragg Grating: fundamentals and application in telecommunication and sensing. A. Othonis and K. Kalli, Artech House, Boston, London, pp. 150-162, 1999. In the first technique, two interfering beams are carved from different areas of the wavefront of a spatially coherent beam. Such splitting, however, results in diffraction at the boundary of the cut, causing the parasitic interference fringes that have been described above. Moreover, this method requires an additional beam expansion if large-sized gratings have to be recorded.

In a second technique, a phase mask is illuminated by a single laser beam, creating interfering beams on a closely positioned target. Therefore, this technique is inapplicable for large-sized or thick grating recording.

In the third method, which is the most universal, two interfering beams are created by splitting a parent beam in two on a partially reflecting beam splitter. The beams are then spatially shaped and combined on a target. This technique has been used for large-sized hologram recording. However, it requires considerable beam expansion for achieving uniform illumination across large areas; therefore, this technique has several drawbacks. More particularly, small-scale distortions in the spatial distribution of the interfering beams result in hologram degradations similar to those caused by diffraction on apertures. The basic sources of such distortions are diffraction on dust particles or on inhomogeneities of optics, and interference between the main beam and the beams re-reflected from the different surfaces of optical setup and recording media. The spatial filters and a clean-room environment may be used to reduce partially the influence of small-scale distortions. However, all the distortions appearing after the spatial filter still result in hologram degradations. One of these drawbacks, namely a parasitic diffraction, can be suppressed by a method described in U.S. Pat. No. 3,834,786 issued Sep. 10, 1974, inventor W. Carlsen to record holograms of transparent optical objects. The patent describes a system imaging an aperture (which was required in the signal channel) on the target plane. Such a method, however, only partially removes unwanted interference patterns because of residual diffraction in the reference channel.

SUMMARY

In accordance with the present invention, a method and apparatus are provided for scanning an input beam of light in a two dimensional pattern and, splitting the scanned input beam of light into two output beams of light, each one of the two output beams of light passing along a different path to a common region on a recording medium, such region scanning the recording medium during the scanning of the input beam of light to produce a diffraction grating in the recording medium by interference between the two output beams of light.

The method and apparatus use two-dimensional scanning of a recording media with an interfering pattern from two optical beams which may be relatively small in comparison with a total grating area. The beam scanning is carried out after beam expansion; therefore, the optical paths of beams after scanner may include only plain mirrors and beam splitters, which can be treated with very high accuracy over very large areas. As a result, the inhomogeneities and distortions of scanner and optical system before the scanner are averaged and they degrade just a little a total contrast of holograms. In addition, the method and apparatus offers the capability of complicated diffraction efficiency profiling (not just homogeneous and bell-shaped) across the gratings by a proper beam power modulation simultaneously with the beam scanning. Thus, the proposed method has advantages, especially in case of recording large-sized gratings with the same spatial frequency over the area. Most prior techniques for grating recording are based on an interference of two well characterized, stationary positioned optical beams. Any displacement of the optical elements even on a fraction of wavelength results in the additional phase shift of the beams and in the spatial shift of interference pattern. Therefore, any vibrations of optical elements and target, or air turbulence must be excluded in holographic setups. With the present invention, two-dimensional scanning of both interfering beams can be considered as a violation of the obvious requirements to a high quality hologram recording, especially in the case of large-sized grating recording.

With such an arrangement, the method and system produce large size grating with small sized beams.

Further, with such arrangement, the above-described complications are circumvented. Additionally, the method an apparatus offers the capability of complicated diffraction efficiency profiling (not just homogeneous and bell-shaped) across the gratings. Finally, one of the basic advantages of the method and apparatus is that it allows recording well-characterized gratings even if the recording beam wavefronts are not perfectly plane and/or if they have small local distortions.

The details of one or more embodiments of the invention are set forth in the accompanying drawings and the description below. Other features, objects, and advantages of the invention will be apparent from the description and drawings, and from the claims

DESCRIPTION OF DRAWINGS

FIG. 5A showing an interference patterns from a small-sized spatially fixed, i.e., not scanned, beam having the same distortions as in FIG. 4; FIG. 5B showing a striped interference pattern after a one dimensional beam scan, i.e., along the X axis; and FIG. 5C showing a resultant interference pattern after multiple scanning of a grating area on the recording medium along both the X and Y axes.

Like reference symbols in the various drawings indicate like elements.

DETAILED DESCRIPTION

Figure 1:
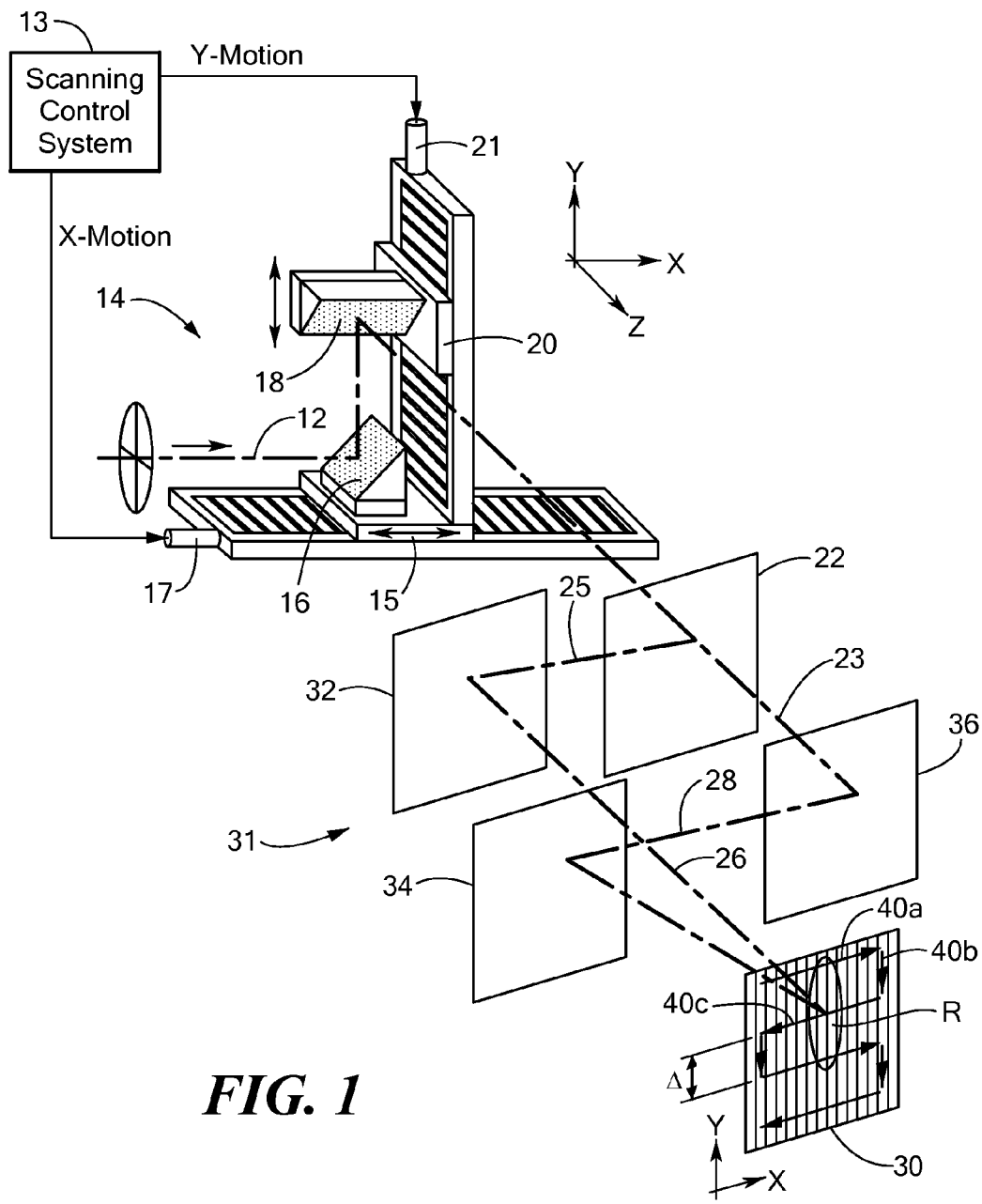
FIG. 1 is a diagrammatical sketch of an interferometer adapted to scan a beam of light in a X-Y plane according to the invention.

Referring now to FIG. 1, an interferometer 10 is shown for recording large-sized high-homogeneous holographic diffraction gratings. It is noted that two-dimensional or three-dimensional (i.e., Bragg) diffraction grating may be recorded.

Light from a laser, not shown, is cleaned from spatial noises and is then expanded in cross sectional area to a proper size, using any standard optical system having a beam expander, not shown, and a spatial filter, not shown, to produce an input beam of light 12. The cross sectional area of the input beam 12 has a Gaussian amplitude distribution and such input beam 12 has a substantially planar wavefront.

The input beam passes to a scanning system 14. The scanning system scans the input beam in two dimensions. Thus, if the input beam 12 passes along an X-axis, the output beam is scanned in the X-Y plane.

Figure 1A:
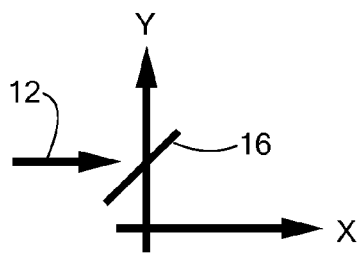
FIG. 1A shows the angular orientation of one of a pair of mirrors in the X-Y plane used in a scanning system of the interferometer of FIG. 1.
Figure 1B:
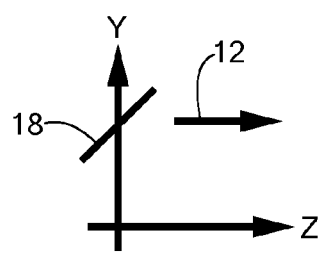
FIG. 1B shows the angular orientation of a second one of the pair of mirrors in the Y-Z plane used in a scanning system of the interferometer of FIG. 1.

More particularly, here, for example, the scanning system has a first structure, here a translation stage 15. The structure 15 has mounted to a pair of mirrors 16, 18. Mirror 16 has a reflecting surface tilted 45 degrees about the X and Y axes, as shown in FIG. 1A and mirror 18 has a reflecting surface tilted 45 degrees about the Y and Z axes, as shown in FIG. 1B. Further, the structure 15 is arranged to move back and forth along the X-axis by a motor 17 that drives a screw, not shown, in response to a signal from a scanning control system 13, such X-axis motion thereby scans the input beam 12 back and forth along the X-axis. It is noted that mirror 18, while mounted to structure 15 is also mounted to a structure 20 here also a translation stage. The structure 20, which mounted to structure 15 is configured to move within structure 15 up and down along the Y-axis by a motor 21 that drives a screw, not shown, in response to a signal from a scanning control system 13. Thus, for any position of the structure 15 along the X-axis, the structure 20 is able to scan the input beam up and down along the Y-axis. It follows then that movement of both the structure 15 and the structure 20 results in scanning of the input beam 12 in two dimensions, here in the X-Y plane.

Next, the scanned input beam 12 is directed in a beam splitter 22 to provide a pair of output beams 23, 25 directed along different paths 26, 28, respectively, to common region R on a surface of a recording medium 30. The recording medium 30 records a diffraction grating generated by interference between the two output beams of light. The two output beams of light maintain a substantially constant cross section here having a substantially Gaussian amplitude distribution as such beams pass to the common region R on the recording medium.

Thus, the two output beams of light 23, 25 maintain a substantially constant cross section between the beam splitter 22 and the recording medium 30.

More particularly, the scanned input beam is directed to four mirrors, i.e., beam splitter 22 and an optical system 31 having mirrors 32, 34, and 36 for directing each one of the two output beams of light along a different path to the common region R on the recording medium 30. The region R is scanned in a two dimensional surface, i.e., in the X-Y plane of the recording medium 30 during the scanning of the input beam of light as indicated by the arrows 40. Here, in this example, at a first position of mirror 18 along the Y-axis, the structure 15 moves along the +X axis to produce a scan indicated by arrow 40a. Next, the structure 20 lowers mirror 18 along the Y-axis with the position of structure 15 fixed to produce a vertical scan along the Y-axis indicated by vertical arrow 40b. It is noted that the length of the scan along the Y-axis indicated by vertical arrow 40b is herein sometimes referred to as the beam shift, Δ. The beam shift Δ should be less than 0.4 to 0.45 times the diameter of the Gaussian beam used for a scanning good homogeneity of exposure dosage.

Next, with the structure 20 fixed along the Y-axis, the structure 15 moves along the −X axis to produce the scan indicated by arrow 40c and the process repeats with the structure 20 lowering mirror 18 as indicated. Thus, scanning system 14 provides two-dimensional scanning of beam over the cross section area of the recording medium 30 and exposure of the target area on such medium 30 with the interference pattern. Here, computer controlled translation stages UTMCC1DD manufactured by Newport Corporation, USA and having the angular accuracy of $10^{-4}$ radians were used. This value was enough small for high quality hologram recording. The spatial frequency of grating depends on the angle between the beams and the wavelength of radiation as described in, for example, an article written by H. Kogelnik, "Coupled wave theory for thick hologram gratings," The Bell System Technical Journal, v. 48, pp. 2909-2945, 1969.

Figure 1C:
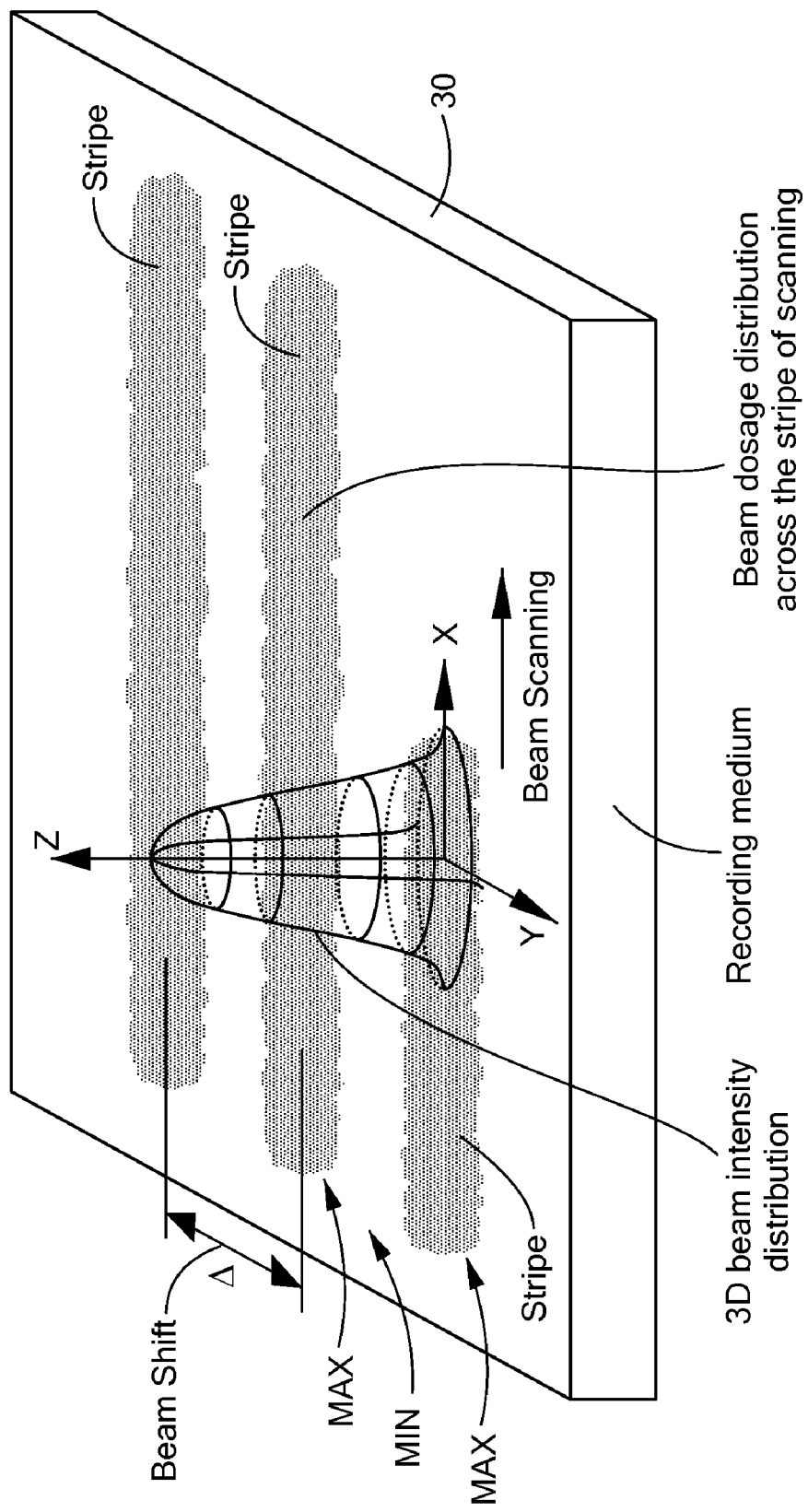
FIG. 1C is a sketch showing dosage distribution over a recording medium used in the system of FIG. 1 after three separate scans of a Gaussian beam in the X direction and successive beam shifts Δ in the Y direction using the system of FIG. 1.
Figure 2A:
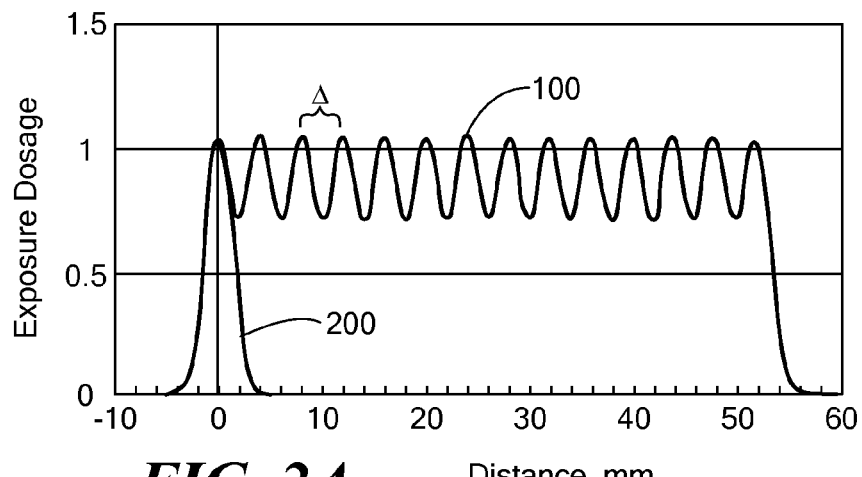
FIGS. 2A-2C are curves showing distributions of exposure dosage on a recording medium used in the interferometer of FIG. 1 after a Gaussian beam has scanned a two dimensional surface of the recording medium to produce a three dimensional diffraction grating in the recording medium.
Figure 2B:
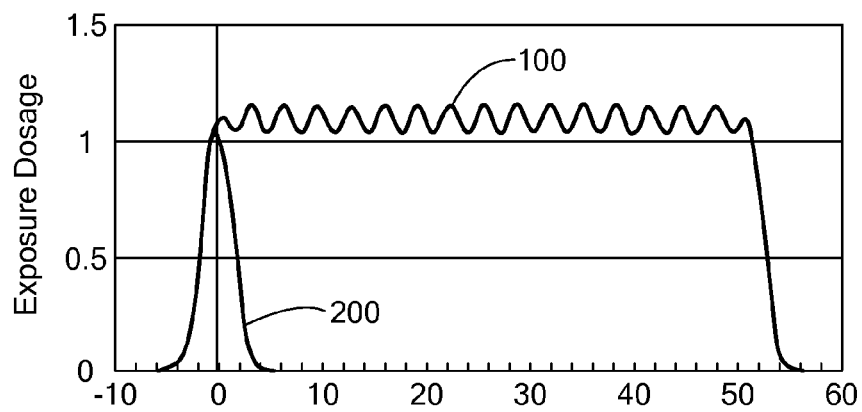
Figure 2C:
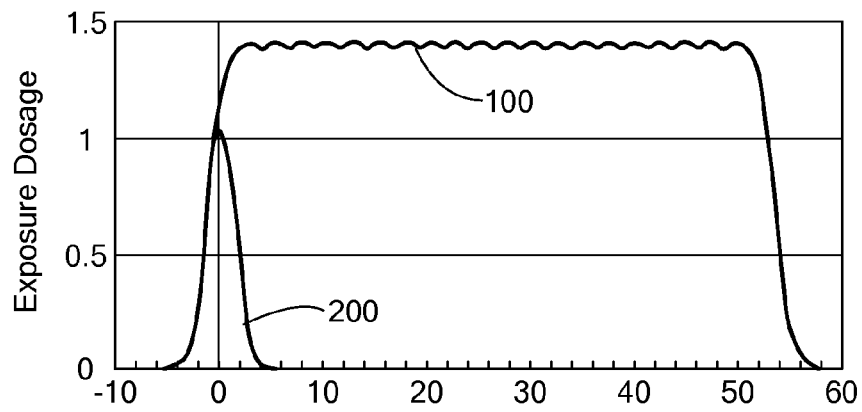

Uniformity of exposure. The uniformity of exposure was provided by a proper scanning pattern of Gaussian beams over the recording medium 30. In experiments to be described, two such patterns were used. One is scanning along parallel lines separated by a distance Δ as described above in connection with FIG. 1. The resultant distributions of intensity across the target area for different values of beam shift Δ are shown in FIG. 2A-2C. FIG. 2A is for a beam shift Δ of 4 mm; FIG. 2B is for a beam shift Δ of 3.2 mm; and FIG. 2C is for a beam shift Δ of 2.5 mm. The curve 200 shows a dosage distribution across the single strip of scanning with a Gaussian beam having a diameter of 5.6 mm measured at $1/e^2$ of maximum, with the Gaussian beam scanned in the X direction, a dosage distribution is in Y direction, as shown in FIG. 1C. The curve 100 shows a dosage distribution across the whole area of grating along the Y axis after overlapping all stripes depending on distance between the stripes, i.e., on beam shift, Δ. It is noted that maximum exposure is along the scanned stripes and minimum exposure occurs in the regions between the scanned stripes. Thus, there is an exposure modulation along the Y-axis. It is observed that the modulation of exposure dosage along the Y axis is decreased with decreasing beam shift, Δ and it is <3% for the beam shifts less than the beam radius. Particularly, it is <1% for parameters used in FIG. 2C i.e., beam shift of 2.5 mm and a beam radius of 5.6 mm.

Figure 3A:
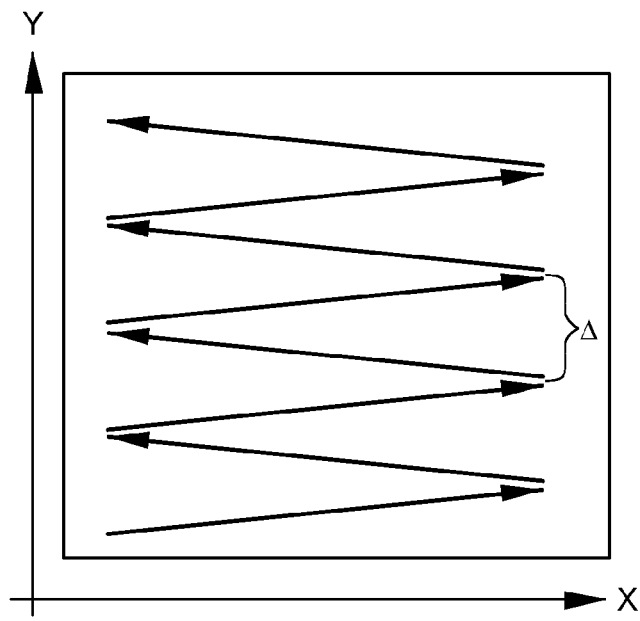
FIG. 3A is an alternative scanning pattern of a Gaussian beam for use with the interferometer of FIG. 1.
Figure 3B:
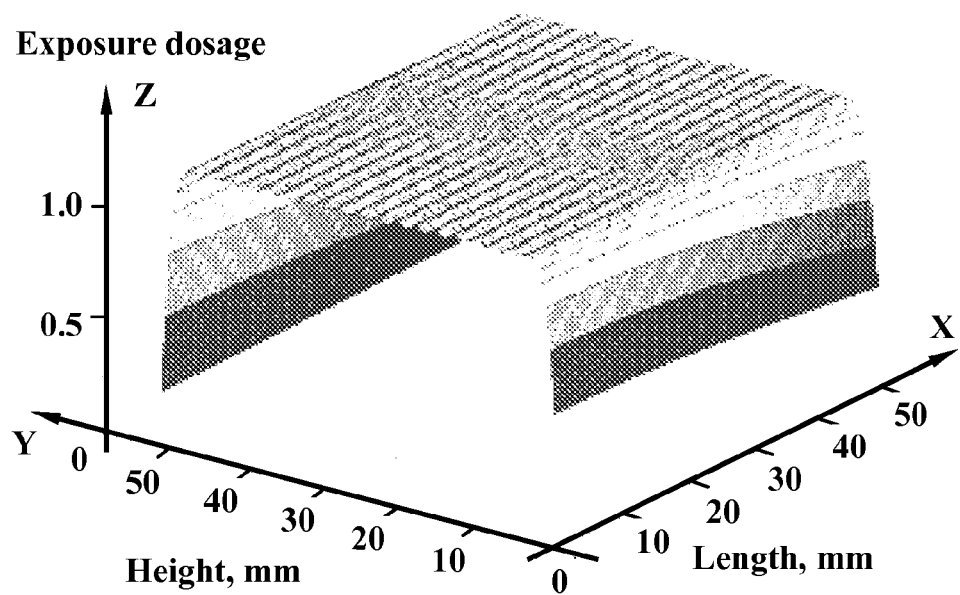
FIG. 3B shows resultant dosage over the length, i.e., along the X axis, and height, i.e., along the Y axis, of a recording medium used in the system of FIG. 1 after scanning a Gaussian beam with the pattern shown in FIG. 3A.

Another scanning pattern used is shown in FIG. 3A and it demonstrates that different scanning patterns can be used for homogeneous distribution of exposure dosage across the recording medium. The dosage distribution for the same value of beam shift as in FIG. 2C is shown in FIG. 3B. Here, the shift is 2.5 mm, the beams have a Gaussian distribution with a diameter of 5.6 mm as above.

In addition, scanning provides a convenient way to control the exposure over the target area. The spatial distribution of a Gaussian beam is given by:

$$I(x, y) = I_o \exp\left(-2\left(\frac{x^2 + y^2}{\omega_o^2}\right)\right)$$

where $\omega_o$ is the beam radius, $I_o = 2P/\pi\omega_o^2$—the peak intensity, and P—the average power of the beam. As described in U.S. Patent Application Publication US 2005/0111781 published May 26, 2005, inventors Oleg M. Efimov and Stanislav I. Ionov, if the beam is scanned along X with velocity V, the exposure dosage may be expressed as:

$$E = \int I_o \exp\left(-2\left(\frac{y}{\omega_o}\right)^2\right) \exp\left(-2\left(\frac{x}{\omega_o}\right)^2\right) \frac{dt}{V} = \sqrt{\frac{2}{\pi}} \frac{P}{V\omega_o} \exp\left(-2\left(\frac{y}{\omega_o}\right)^2\right)$$

This formula allows easy calculation of required dosage if scanning technique is used. Besides, one can see that the dosage is determined by the total power of optical beam and the scanning velocity. Therefore, computer controlled variation of scanning velocity and/or total beam power give a convenient way for two dimensional profiling of exposure dosage and diffraction efficiency of recorded grating.

Parasitic diffraction patterns exclusions. As it was mentioned above, a large beam expansion required for large-sized grating recording is hard to implement without truncating its edges that results in imprinting parasitic diffraction patterns into the gratings. In proposed method the size of recording beam is considerably smaller than the size of hologram; therefore, scanning can be done so as to exclude any truncating the beam edges. It is easy to implement if the plain mirrors of interferometer (i.e., mirrors 22, 32, 34, and 36 in FIG. 1) are a little larger in size than the size of scanning area. More exactly, their dimensions have to exceed the size of target plus the diameter of the beam. All the other optical elements needed for recording beam formation and its scanning can still have relatively small sizes.

Figure 4:
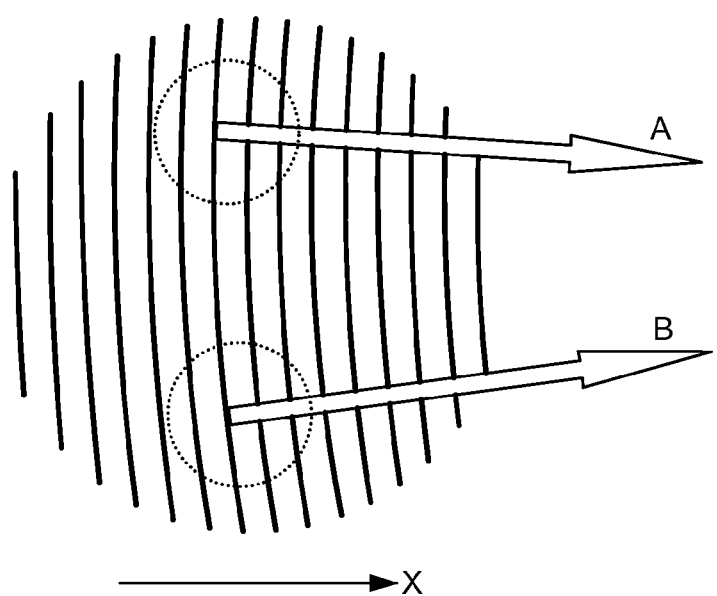
FIG. 4 is an example of an interference pattern from a large-sized stationary beams having residual sphericity of wavefronts; with grating vectors A and B in different areas of the recorded grating shown have different directions thereby indicating the diffraction efficiency is different under reconstruction with a beam having a plane wavefront incident thereon.

Mitigating distortions and optical inhomogeneities. One of the very important advantages of the method is that it allows recording well-characterized gratings even if the recording beam wavefronts are not perfectly plane and/or if they have small local distortions. The application of standard method for a large-sized grating recording necessitates extremely large beam expansion. This is difficult to implement without the wavefront distortion of the beam as a whole. For instance, if a recording beam does not have perfectly plane wavefront, the interference fringes can have small curvature as shown in FIG. 4. This results in a little different angle of grating vector in different region of target (e.g., vectors A and B in FIG. 4) and in different diffraction efficiency across the grating when it is reconstructed with a plane wavefront beam. Moreover, large-sized optical elements usually have a lot of small imperfections connected with surface defects or inhomogeneities of refractive index. They result in distortions and diffraction of transmitting beams which are imprinted on the gratings.

The method operating with small-sized beams overcomes these problems. First, making small-sized optical elements as well as formation of small diameter well-characterized beams is considerably simpler than a large-sized optics and beams. Next, even if the beam has distortions, they are mitigated during a beam scanning.

Figure 5A:
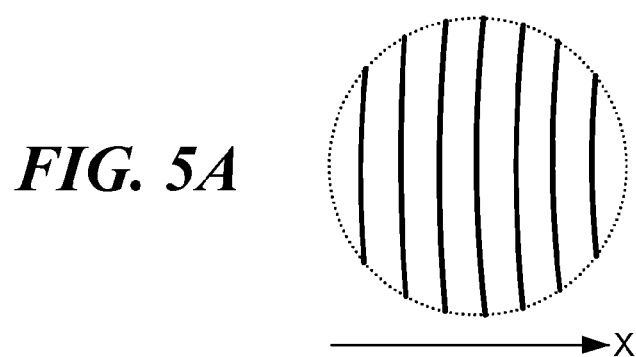
FIGS. 5A-5C show beam distortion influence on grating recording quality for the interferometer of FIG. 1.
Figure 5B:
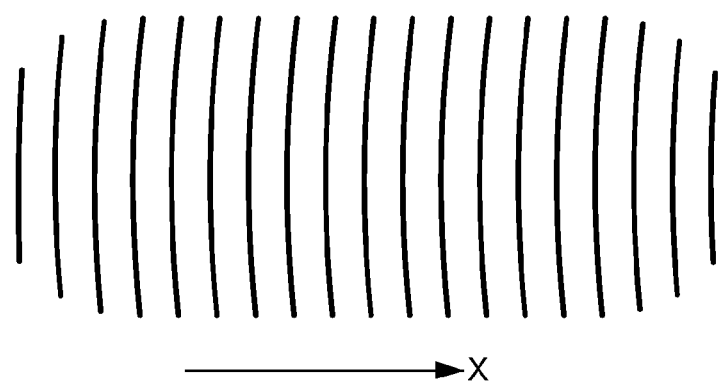
Figure 5C:
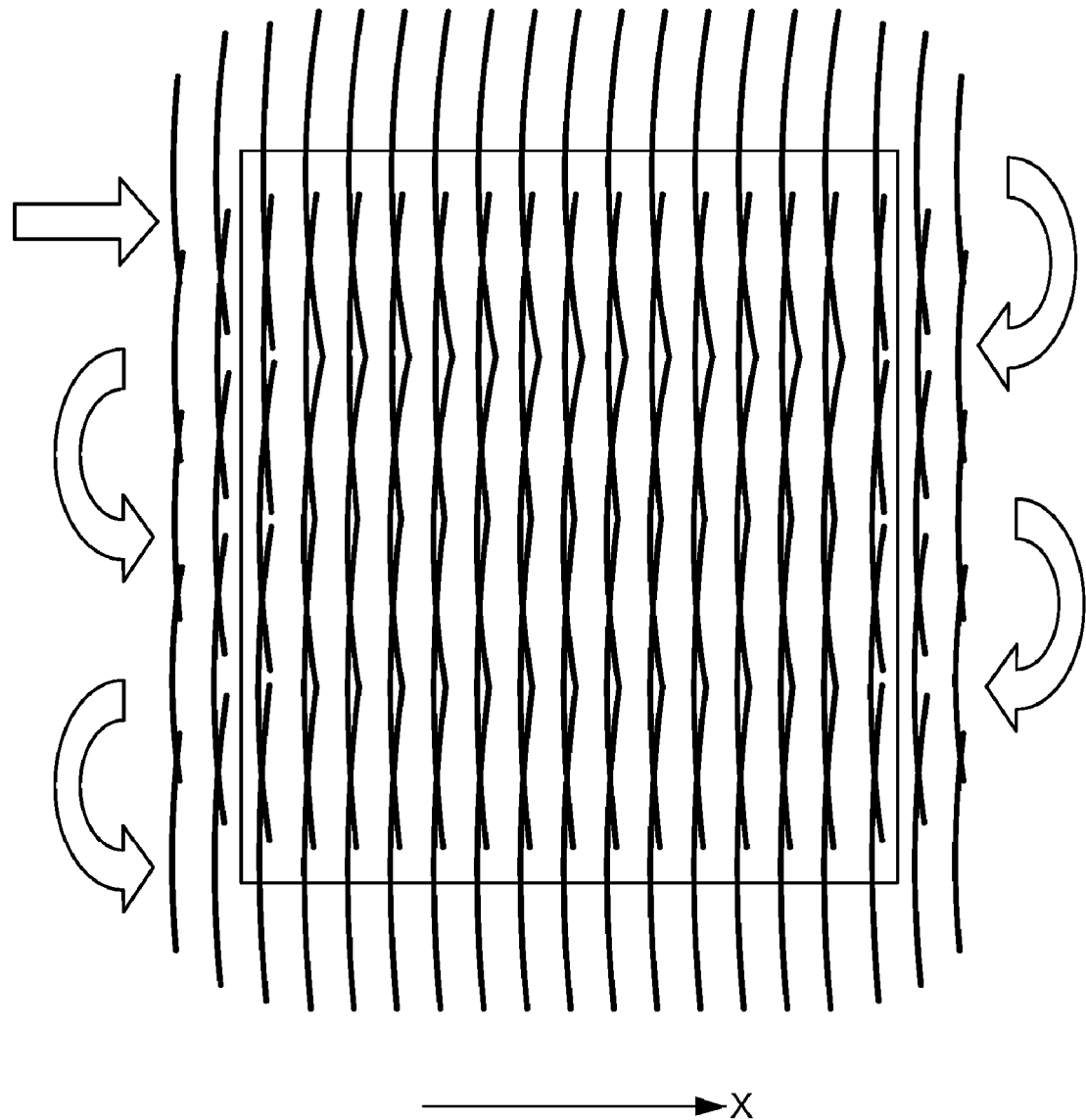

More particularly, referring to FIGS. 5A-5C, such FIGS. show beam distortion influence on grating recording quality for the interferometer of FIG. 1 with interference patterns of a spatially fixed, i.e., not scanned, beams (FIG. 5A) having the same distortions as in FIG. 4; a striped interference pattern after a one directional scanning these beams (FIG. 5B); and a resultant interference pattern after multiple scanning of a grating area on the recording medium (FIG. 5C).

Consider the interference of small diameter beam (FIG. 5A) with the same distortions as in FIG. 4. As a result of beam scanning along direction X, the stripe with interference pattern shown in FIG. 5B is obtained. Repeatable beam scanning with the above mentioned pattern (FIG. 2C) results in overlapping of stripes like shown in FIG. 5C and leads to the homogeneous exposure of area A. This exposure is the integrated exposure with the different spatial parts of scanning beams. Since the main area of two-beam interference has a good quality and proper orientation, the resultant recorded grating will have the same frequency and vector direction in different regions. All the distortions of the beams influence only the contrast of grating and the width of fringes. Finally, the influence of small local imperfections is even less because each small area of grating is exposed with distorted parts of beams very short time in comparison with the total exposure time of this area.

The method for the large-sized high-homogeneous holographic gratings recording was confirmed experimentally. The method was used to provide uniform holograms over a large area ~50 mm×50 mm. A single-line (334 nm) Argon laser (Innova 400 by Coherent, Inc.) was used to produces a nearly Gaussian beam with less than 2 mm diameter. It was cleaned from spatial noises and expanded up to the diameter of 9 mm. Then this beam was directed to the scheme shown in FIG. 1. All the mirrors 22, 32, 34, and 36 had the size >70 mm that allowed recording the high quality thick Bragg gratings with the mentioned sizes of 50 mm×50 mm in a photosensitive glass from Corning, Inc. The procedure for glass exposure and thermal development can be found, for instance, in an article entitled "High-efficiency Bragg gratings in photo-thermorefractiive glass" by O. M. Efimov, L. B. Glebov, L. N. Glebova, K. C. Richardson, V. I. Smirnov, published in Appl. Optics, Optical Technology and Biomedical Optics (OT&BO), 38, 619-627, (1999), the subject matter therein being incorporated herein by reference. The grating was optimized for a wavelength of 1550 nm. A collimated beam of 45 mm diameter was used to measure the absolute diffraction efficiency η of grating which was defined as $$\eta = \frac{P_{dif}}{(1-\rho)^2 P_{inc}}$$

where $P_{inc}$ and $P_{dif}$ are the power of incident and diffracted beams, respectively, and ρ is the reflection coefficient of glass surface. The diffraction efficiency of 97.3% was achieved for large sized beam at wavelength of 1550 nm.

Figure 6A:
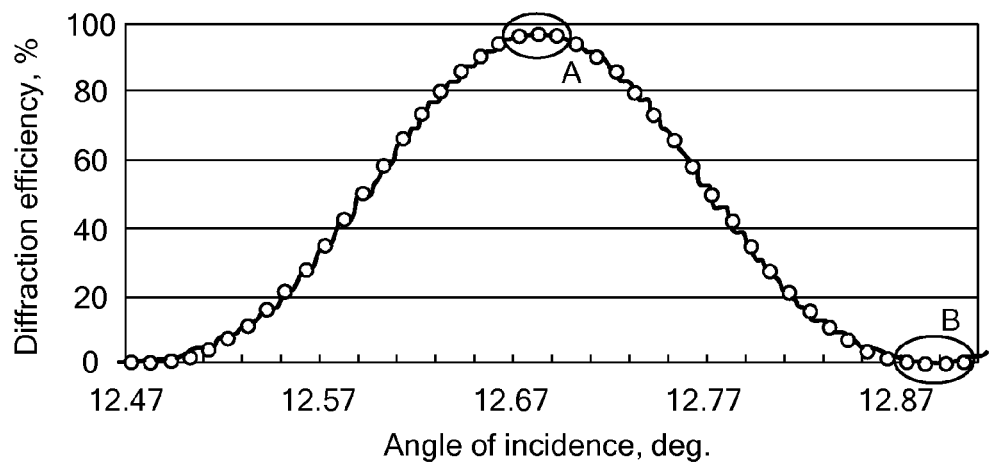
FIGS. 6A-6C are curves showing the dependence of diffraction efficiency of a Bragg grating recorded using the system of FIG. 1 on the angle of incidence where the solids lines indicate the measured data and the circles indicate the calculated (i.e., theoretical) data.
Figure 6B:
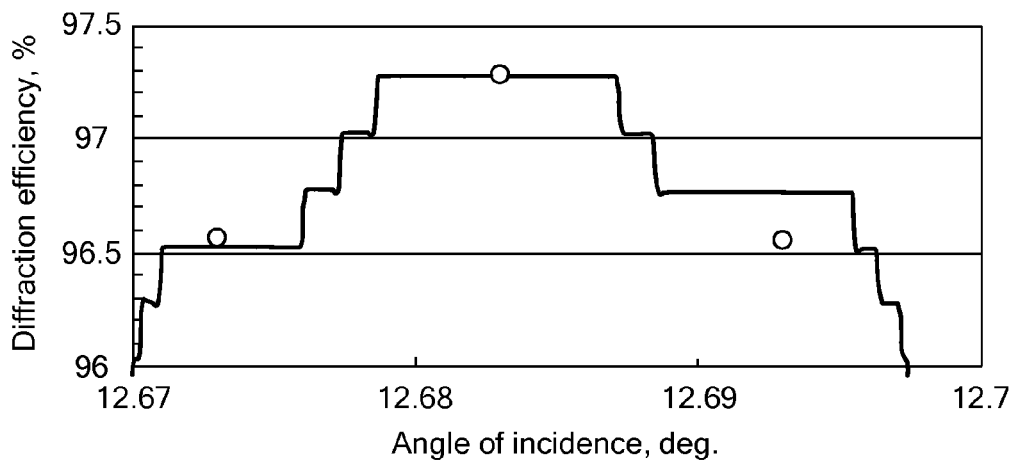
Figure 6C:
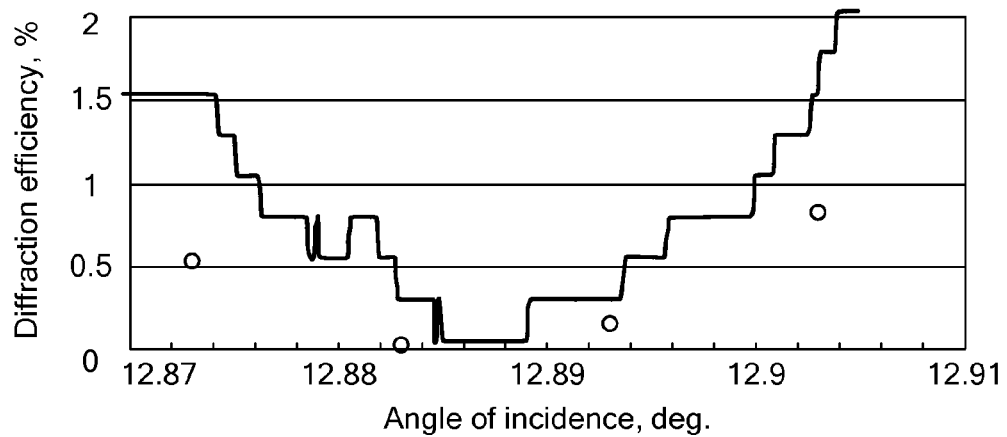

FIGS. 6A-6C show the dependence of diffraction efficiency of recorded Bragg grating on the angle of incidence where the solids lines indicate the measured data and the circles indicate the calculated (theoretical) data. The plane wavefront beam with a diameter of 45 mm was used in measurements. FIGS. 6B-6C show magnified fragments A and B from FIG. 6A. On the one hand, the data in FIG. 6B demonstrate rather high diffraction efficiency over large area of grating. On the other hand, the proximity of measured curve to zero shown in FIG. 6C indicate very high homogeneity of grating because even small deviation of grating parameters from averaged ones will result in the increase of diffraction efficiency in the region of theoretical zero. Good coincidence between measured and calculated data (FIG. 6A), high diffraction efficiency over a large area of grating (FIG. 6B), and small diffraction efficiency of grating in the region of theoretical zero (FIG. 6C) indicate that the recording medium was exposed with a highly uniform dosage over its area and had very good homogeneity of grating parameters over the whole grating area. Thus, the method allows recording large-sized high-homogeneous well-characterized holographic gratings even if the recording beam wavefronts are not perfectly plane and/or if they have small local distortions.

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising:
   continuously scanning an input beam of light in a two dimensional pattern;
   splitting the scanned input beam of light into two output beams of light, each one of the two output beams of light passing along a different path to strike a recording medium, such recording medium having a front side and a back side, such two output beams being directed to strike a common region from the same one of either the front side or back side of the recording medium, such region scanning the recording medium and being concurrently recorded by the scanning medium continuously during the continuous scanning of the input beam of light to produce a diffraction grating in the recording medium by interference between the two output beams of light; such splitting comprising:
      directing the scanned input beam to an optical system comprising a beam splitter mirror and three mirrors for directing each one of the two output beams of light along a corresponding one of the different paths to the common region on the recording medium, one of the two beams reflecting from a first one of the three of mirrors and the other one of the two beams reflecting from a second one and a third one of the three mirrors.

2. The method recited in claim 1 wherein the optical system between the beam splitter mirror and the recording medium is a totally reflective system.

3. A method, comprising:
   scanning an input beam of light in a two dimensional pattern;
   splitting the scanned input beam of light into two output beams of light, each one of the two output beams of light passing along a different path to strike a recording medium, such recording medium having a front side and a back side, such two output beams being directed to strike the common region from the same one of either the front side or back side of the recording medium, such region scanning the recording medium during the scanning of the input beam of light to produce a diffraction grating in the recording medium by interference between the two output beams of light; such splitting comprising:
      directing the scanned input beam to an optical system comprising a beam splitter mirror and three mirrors for directing each one of the two output beams of light along a corresponding one of the different paths to the common region on the recording medium, one of the two beams reflecting from a first one of the three mirrors and the other one of the two beams reflecting from a second one and a third one of the three mirrors; and
   wherein the two output beams of light maintain a substantially constant cross section as such beams pass from the beam splitter mirror to the common region in the recording medium.

4. The method recited in claim 3 wherein the cross section has a Gaussian amplitude distribution.

5. The method recited in claim 3 wherein the optical system between the beam splitter mirror and the recording medium is a totally reflective system.

6. Apparatus, comprising:
   scanning apparatus for scanning an input beam of light in a two dimensional pattern;
   a recording medium having a front side and a back side;
   a beam splitter for splitting the scanned input beam of light into two output beams of light;
   an optical system comprising a plurality of mirrors for directing each one of the two output beams of light passing along a different path to strike a common region on the same one of either the front side or the back side of the recording medium, such region scanning the recording medium continuously recorded by the recording medium during continuous scanning of the input beam of light to produce a diffraction grating in the recording medium by interference between the two output beams of light; such optical system comprising: a beam splitter mirror and a plurality of mirrors for directing each one of the two output beams of light along a corresponding one of the different paths to the common region on the recording medium, one of the two beams reflecting from a first one of the plurality of mirrors and the other one of the two beams reflecting from a second one and then a third one of the plurality of mirrors.

7. The apparatus recited in claim 6 wherein the two output beams of light maintain a substantially constant cross section between the beam splitter and the recording medium.

8. The apparatus recited in claim 7 wherein the cross section has a Gaussian amplitude distribution.

9. The apparatus recited in claim 7 wherein the optical system between the beam splitter and the recording medium is a totally reflective system.

10. The apparatus recited in claim 6 wherein the optical system between the beam splitter and the recording medium is a totally reflective system.

11. A method, comprising:
scanning an input beam of light in a two dimensional pattern during recording;
splitting the scanned input beam of light into two output beams of light, each one of the two output beams of light passing along a different path to strike a recording medium, such recording medium having a front side and a back side, such two output beams being directed to strike the common region from the same one of either the front side or back side of the recording medium, such region scanning the recording medium during the scanning of the input beam of light to produce a diffraction grating in the recording medium by interference between the two collimated output beams of light where a scanning pattern provides a homogeneous distribution of exposure dosage over the area of recording medium.

12. The method recited in claim 11 wherein the splitting comprises:
directing the scanned input beam to an optical system comprising a beam splitter mirror and a plurality of mirrors for directing each one of the two output beams of light along a corresponding one of the different paths to the common region on the recording medium, one of the two beams reflecting from a first one of the plurality mirrors and the other one of the two beams reflecting from a second and a third one of the plurality of mirrors.

13. The method recited in claim 12 wherein the two output beams of light maintain a substantially constant cross section as such beams pass between the beam splitter and the common region in the recording medium.

14. The method recited in claim 13 wherein the optical system between the beam splitting and the recording medium is a totally reflective system.

15. The method recited in claim 12 wherein the optical system between the beam splitting and the recording medium is a totally reflective system.

16. The method recited in claim 11 wherein the two output beams of light maintain a substantially constant cross section as such beams pass between the beam splitter and the common region in the recording medium.

17. The method recited in claim 16 wherein the optical system between the beam splitting and the recording medium is a totally reflective system.

18. The method recited in claim 11 wherein the optical system between the beam splitter and the recording medium is a totally reflective system.

* * * * *